United States Patent [19]

Cox, Jr.

[11] 4,301,897
[45] Nov. 24, 1981

[54] SLACK ADJUSTER

[76] Inventor: Frank T. Cox, Jr., Villa 111 Imperial Southgate, Lakeland, Fla. 33803

[21] Appl. No.: 103,048

[22] Filed: Dec. 13, 1979

[51] Int. Cl.³ .............................................. F16D 65/56
[52] U.S. Cl. ..................... 188/196 BA; 188/79.5 GE; 188/343
[58] Field of Search ............... 188/79.5 GE, 79.5 GT, 188/79.5 S, 196 BA, 202, 343

[56] References Cited

U.S. PATENT DOCUMENTS

| | | | |
|---|---|---|---|
| 1,509,225 | 9/1924 | Broluska | 188/196 BA |
| 2,283,966 | 5/1942 | Brown | 188/202 |
| 3,618,715 | 11/1971 | Bostwick | 188/196 BA |
| 3,780,836 | 12/1973 | Dewstead | 188/196 BA |
| 3,868,001 | 2/1975 | Yokoi | 188/72.4 |
| 3,869,025 | 3/1975 | Oliver | 188/196 BA |
| 3,882,974 | 5/1975 | Hill | 188/79.5 GE |
| 4,085,830 | 4/1978 | Bottoms et al. | 188/79.5 GE |

*Primary Examiner*—Edward R. Kazenske

[57] ABSTRACT

An automatic or manually adjustable slack adjuster for inclusion in a reciprocating, force transmitting mechanical mechanism that must function in a relatively maintenance free manner in a hostile, corrosive atmosphere. The adjuster, while utilizing the ratchet-worm principal, is capable of exerting relatively large adjusting forces while having relatively small physical dimensions. All working parts other than input and output rods may be sealed against the atmosphere and permanently lubricated, although access to such parts is available for manual adjustment if desired.

5 Claims, 4 Drawing Figures

SLACK ADJUSTER

BACKGROUND OF THE INVENTION

The use of slack adjusters to compensate for "play" or looseness occurring in reciprocating mechanisms due to gradual wear of parts or other causes, long has been known. Early examples of such devices may be seen from U.S. Pat. Nos. 893,220, issued July 14, 1908, 1,328,341, issued Jan. 20, 1920, and 1,796,009, issued Mar. 10, 1931. One of the most obvious applications for slack adjusters of the automatic type in the power tranasmitting mechanism of vehicle brakes, since the gradual wear of brake friction members is an inherent condition causing slack in brake devices. Examples of slack adjusters in vehicle brake mechanisms may be seen from the teachings of U.S. Pat. Nos. 1,509,225, issued Sept. 23, 1924, 2,792,085, issued May 14, 1957, and 3,511,103, issued May 12, 1970.

The last of these patents, issued in the name of the inventor of this invention, is illustrative of certain shortcomings in the state of the slack adjuster art that have prevented the wide commercial acceptance of certian devices including slack adjusters. This patent discloses a so-called "wedge" brake mechanism whereby braking is actuated by the linear movement of a wedge between two force transmitting assemblies, causing opposite movement of these assemblies and movement of the brake shoes, driven by the assemblies, into braking positions. Although it generally is recognized by experts in the vehicle brake field that brakes utilizing the wedge principal possess many advantages over other types of brakes in numerous usages, commercial acceptance of wedge brakes has been less than would seem justified by these advantages. It is believed that a primary reason for this is the heretofore unavailability of a wholly satisfactory slack adjuster for inclusion in wedge brake assemblies, as well as other usages where the slack adjuster must function automatically in a relatively maintenance free manner in an environment extremely hostile to mechanical devices, and yet be easily adjusted manually during maintenance.

For example, the slack adjuster illustrated in the above mentioned U.S. Pat. No. 3,511,103 permits threads formed on its output member to be exposed to the normal atmosphere in which vehicle brakes function, an atmosphere including road grime and corrosion promoting chemicals such as salt. While an attempt was made to remedy this exposure by the disclosure of U.S. Pat. No. 3,797,613, issued Mar. 19, 1974, by use of an elastomeric boot to protect adjuster threads, it readily may be appreciated that any failure or malfunction of the boot under vehicle operating conditions would expose the threads of the slack adjuster to possible damage. While the prior art has included slack adjusters wherein vulnerable operating elements such as threads are not exposed or potentially exposed to ambient conditions (as disclosed by above mentioned U.S. Pat. No. 1,509,225), it is believed such arrangements have been disclosed only in configurations of relatively large axial lengths compared to thread diameters. These configurations could not be used easily in applications such as vehicle brakes where packaging space for slack adjusters is quite limited, but relatively large forces must be generated to accomplish the desired adjustment.

It is, therefore, an object of the present invention to provide an automatic adjuster in which the vulnerable working parts completely are sealed from the ambient atmosphere, and may in fact be surrounded by an anticorrosion, lubricating medium. A further object of this invention is to provide such a slack adjuster that easily may be adjusted manually when desired. A still further object of the invention is the provision of such a slack adjuster that has few and simple working parts such that it is extremely compact in size, simple to assemble and reliable in performance.

SUMMARY OF THE INVENTION

An automatic or manually adjustable slack adjuster constructed in accordance with this invention is adapted for inclusion in a reciprocating, force transmitting mechanism and functions by increasing its length along the path of mechanism movement after such movement in a first direction exceeds a predetermined magnitude. The slack adjuster includes a housing having an elongated passage extending therethrough along the path of movement, with the passage having a smooth internal wall. Smooth outer walled input and output rods are slidingly telescopically received in opposite ends of the housing and are spaced apart therein, with means preventing relative rotation between the housing and the rods. The end of one of said rods within the housing passage has an internally threaded blind bore formed therein. An elongate adjusting screw has external threads formed on a first portion of its length which at least partially is telescopically and threadably received in the blind bore. A worm reel is formed on a second portion of the screw with the end of the screw proximate the wheel abutting the end of the other of the rods within the passage. Mounting means secured for movement with the other of the rods mounts a worm gear shaft with a worm gear thereon oriented transversely through the passage and capable of rotating about its own axis and moving along the passage. Sensing means secured to the shaft and housing cooperate to sense shaft movement of a predetermined magnitude along the passage in a first direction, and cause shaft rotation upon subsequent shaft movement opposite to said first direction only after the shaft movement of predetermined magnitude. This shaft rotation causes worm wheel and adjusting screw rotation so that the screw is partially threaded out of its previous position in the one rod, thereby effectively increasing the length of the slack adjuster.

DETAILED DESCRIPTION OF THE INVENTION

Figure 1:
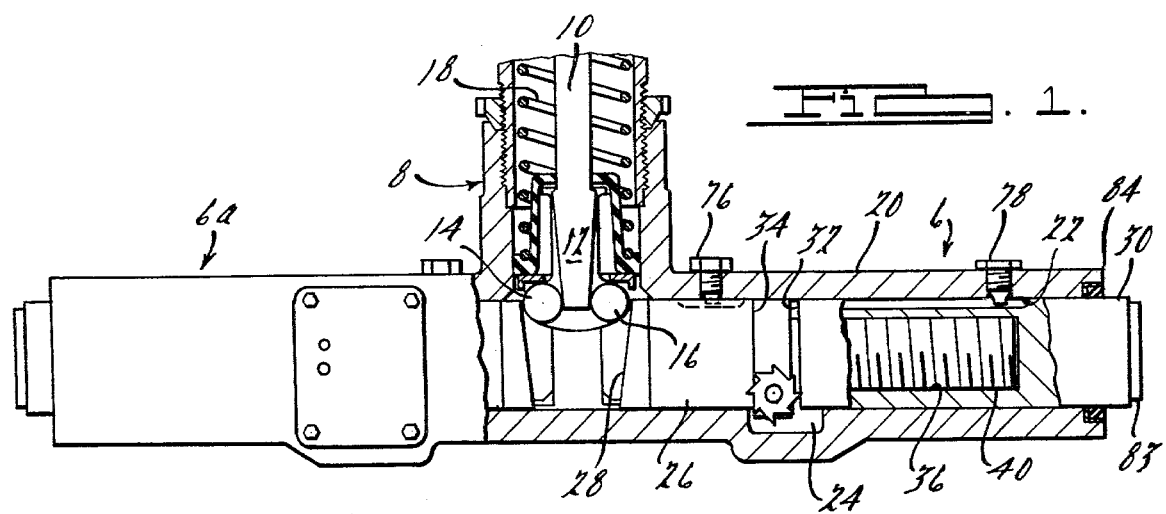
FIG. 1 is a plan view of two slack adjusters constructed in accordance with this invention and shown as utilized in a portion of a vehicle wedge brake assembly, with parts broken away and parts partially in section.
Figure 2:
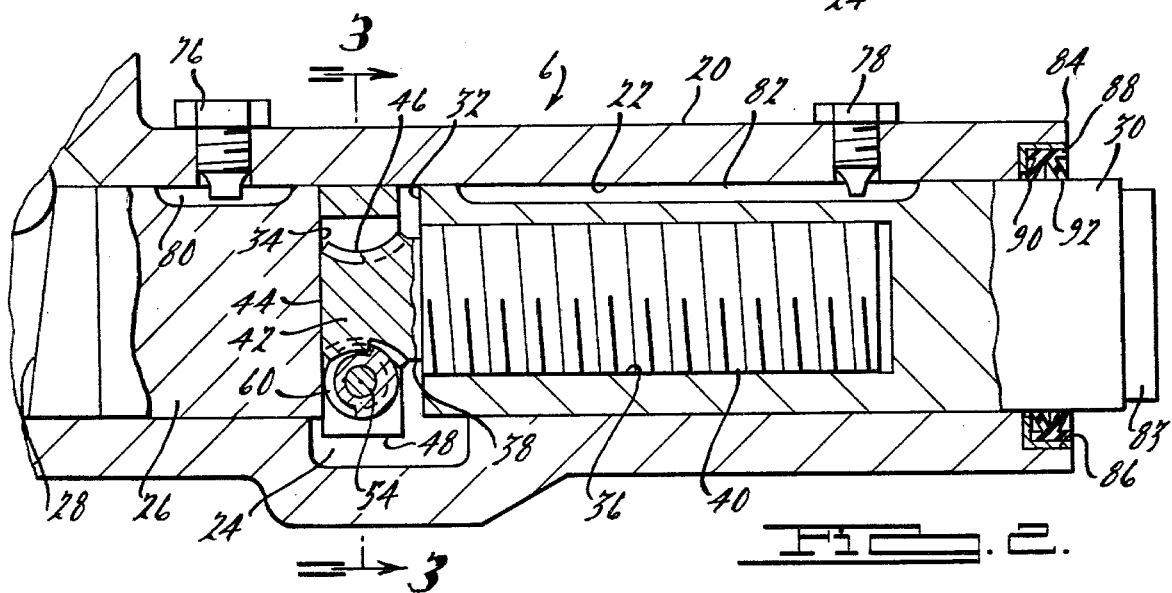
FIG. 2 is an enlarged view, partially in section, of the slack adjuster shown on the right hand side of FIG. 1.

Referring now in detail to the drawing, and in particular to FIGS. 1 and 2 thereof, the numerals 6 and 6a denote two slack adjusters constructed in accordance with this invention. For purposes of illustration only, these slack adjusters are shown as part of a vehicle wedge brake assembly 8 only partially shown. The wedge brake assembly 8 comprises no part of the present invention and it is sufficient for purposes hereof to note that the wedge brake includes a reciprocating rod 10 with a wedge 12 formed on the end thereof. The brake motor means (not shown), conventionally a fluid motor, exerts a force moving rod 10 downward as viewed in FIG. 1, such that wedge 12 moves between the rollers 14 and 16, forcing the rollers in opposite directions away from the axis of movement of rod 10. This movement of the rollers is transmitted by the slack adjusters 6 and 6a to move brake shoes into engagement with brake drums in the conventional manner. Release of the brakes is accomplished by a termination of the force from the brake motor, a subsequent upward movement of rod 10 due to the force exerted by compression spring 18 and the withdrawal of wedge 12 from between the rollers 14 and 16. Slack adjusters 6 and 6a then are returned to their original positions due to the force of the brake return springs (not shown), acting on the brake shoes as is conventional.

The above described operation of the brake assembly 8 is important only in that it is exemplary of the use of the slack adjuster of this invention in a reciprocating mechanical mechanism. Upon the development of slack in such a mechanism, as will occur in a brake assembly upon wear of the brake shoes, each slack adjuster will be elongated along the axis of reciprocation as is explained below.

Slack adjuster 6, identical to adjuster 6a, has an outer housing 20 shown in the drawing as an integral part of assembly 8. In many applications of use for the slack adjuster of this invention, however, the outer housing is a separate element. Housing 20 has an elongate internal passage extending along its length with a smooth internal passage surface 22. A portion 24 of the passage is enlarged and located between the passage ends.

A force input push rod 26 partially is slidingly and telescopically received in one end of housing 20 (the housing end proximate roller 16 in the brake assembly illustrated) and optionally may be formed with a tapered end surface 28 to enlarge the movement of the slack adjuster elements upon downward movement of the wedge 12 when adjuster 6 is used in the brake assembly 8.

A force output push rod 30 partially is slidingly and telescopically received in the end of housing 20 remote from input rod 26 with the end 32 of rod 30 being spaced from the end 34 of rod 26. An internally threaded, cylindrical blind bore 36 is formed within a substantial portion of rod 30 and opens on end surface 32. An adjustment screw 38 is externally threaded along the major portion 40 of its length. Threaded portion 40 of screw 38 threadably is received within bore 36. The minor portion 42 of screw 38 is of reduced diameter compared to screw portion 40, is located within the enlarged portion 24 of the passage through housing 20 and has an end face 44 that abuts end face 34 of the input rod 26. A worm wheel provile 46 is formed on the outer surface of portion 42.

Figures 3, 4:
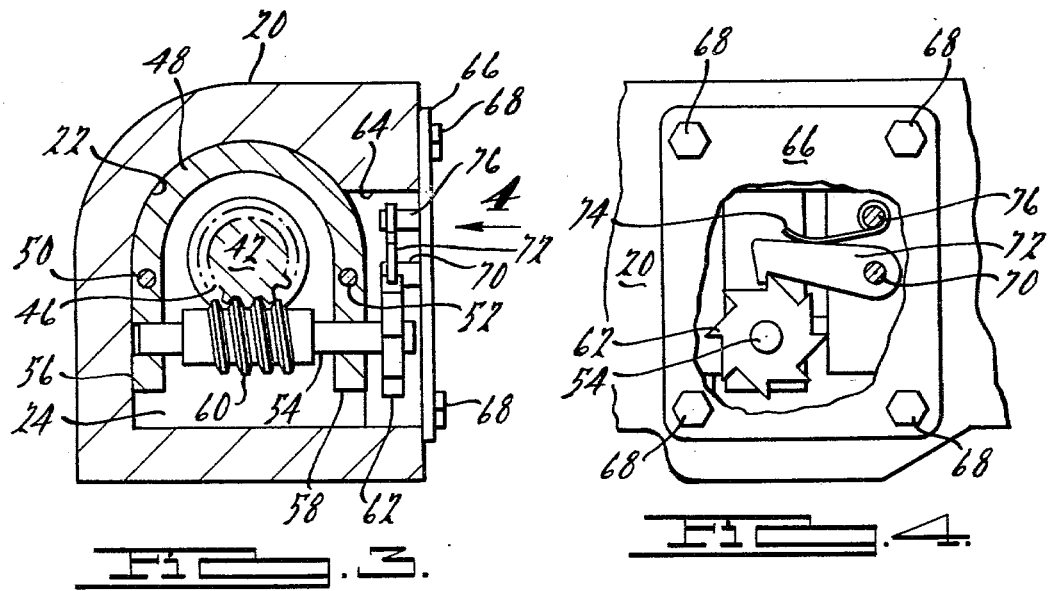
FIG. 3 is a section view taken along the line 3—3 of FIG. 2.
FIG. 4 is a view, taken along the direction of the arrow 4 of FIG. 3, of a portion of the exterior of the slack adjuster of FIG. 3, with a part broken away.

As best may be seen from FIG. 3, a U-shaped bracket 48 is illustrated as secured to the end face 34 of input rod 26 by fasteners 50 and 52 that may be screws, pins or any other suitable fastening element. A worm shaft 54 is journalled for rotation in arms 56 and 58 of bracket 48 so as to extend laterally across the enlarged portion 24 of the housing passage. A worm gear 60 is formed on an enlarge portion of shaft 54 and engages worm wheel profile 46 of adjustment screw portion 42. One end of shaft 54 extends through bracket arm 58 and mounts a ratchet wheel 62 thereon for unitary rotation with the shaft 54.

An access opening 64 is formed through the wall of housing 20 at the location of the enlarged portion 24 of the housing passage. A cover plate 66 removably is secured by fasteners 68 to housing 20 to close and seal opening 64. A pin 70 extends from the inner surface of plate 66. A ratchet pawl pivotally is mounted on pin 70 and is urged into engagement with ratchet wheel 62 by a leaf spring 74 that is mounted by a pin 76 that extends from the inner surface of plate 66.

It is important to the operation of slack adjuster 6 that input rod 26 and output rod 30, while being freely slidable along the length of the housing passage, must be held against rotation. This is accomplished by screws 76 and 78 received in threaded holes through housing 20 and extending into elongate slots 80 and 82 or rods 26 and 30, respectively. Slot 80 need be of a length only slightly greater than the length of reciprocation of the mechanism in which slack adjuster 6 is utilized, while slot 82 is of a length sufficient to accommodate the maximum anticipated adjustment (enlargment) of the length of the slack adjuster 6. In a brake assembly such as the one illustrated by the drawing, screw 78 and slot 82 optionally may be eliminated in favor of a projection 83 formed on the end of rod 30 that projects from housing 20. A brake shoe slot may receive projection 83, thus preventing rotation of rod 30.

As may be seen from FIG. 2, the end 84 of housing 20 from which output rod 30 projects, has a recess 86 formed therein in which a seal 88 is located. This seal includes a pair of spaced apart lips 90 and 92, the functions of which are explained below.

In operation, the manner in which slack adjuster 6 transmits reciprocal movement as part of a mechanical mechanism can be seen from its operation as part of the illustrated brake assembly. Upon input force being applied to surface 28 of input rod 26, this rod, together with bracket 48, worm shaft 54 and ratchet wheel 62 move to the right as viewed in the drawing, forcing adjustment screw 38 and output rod 30 to the right. Upon termination of the force on input rod 28 and return movement of the parts due to a leftwardly directed return force on output member 30, as may be applied by a brake return spring, the parts return to their original positions. In the event of the occurrance of slack in the mechanism of a predetermined magnitude, as will develop upon sufficient usage of the brake shoes to cause substantial wear, such slack will be detected by the adjuster 6. Such slack detection will be prompted by sufficient movement to the right of the ratchet wheel 62 such that pawl 72 passes over one ratchet tooth and engages the face of the tooth located counterclockwise and immediately adjacent the tooth face previously engaged. It readily may be understood that upon return movement of the ratchet wheel to the left as viewed in the drawing, the engagement of the pawl and ratchet wheel causes a clockwise rotation of the wheel 62, shaft 54 and worm gear 60. The rotation of worm gear 60 and its engagement with worm wheel profile 46 causes rotation of adjustment screw 38 which thus partially is threaded out of bore 36, since rod 30 is held against rotation. The movement of screw 38 out of bore 36 effectively elongates slack adjuster 6 to compensate for and remove from the mechanism the slack detected.

When it is desired or necessary to adjust the slack adjuster 6 manually, as will be done when a brake assembly has new linings installed therein, the closure plate 66 easily may be removed together with pawl 72 and spring 74, and ratchet wheel 62 rotated by hand or by use of a conventional tool to obtain the desired length for the slack adjuster 6.

The design and construction of slack adjuster 6 allows its reliable operation in hostile environments such as are encountered by motor vehicle running gear and other devices in which a slack adjuster may be included. It may be seen that the working parts of slack adjuster 6 vulnerable to damage, such as the screw threads formed on output rod 30 and adjustment screw portion 40, the worm gear and worm wheel profile and the ratchet mechanism completely are contained within the device and may be lubricated and protected by a suitable fluid such as oil that is used to fill enlarged passage portion 24 as well as the internal cavity of the brake assembly 8 in the slack adjuster application illustrated. Such protection of the slack adjuster parts is facilitated by the seal 88 and its double lip design. Other seal 92 projects against the entry of dirt and contaminents into the device, and the inner seal 90 prevents leakage of lubricant from within the housing 20.

The slack adjuster of this invention also provides a design including only a few moving parts that are of simple, sturdy and inexpensive construction, but which design permits the development of a wide range of adjusting forces by varying the screw thread and worm dimensions and characteristics to obtain a desired force.

What is claimed is:

1. An automatic or manually adjustable slack adjuster for inclusion in a reciprocating force transmitting mechanical mechanism and which increases in length along the path of mechanism movement following mechanism movement exceeding a predetermined magnitude, said slack adjuster including: a housing having an elongate generally smooth walled passage having a longitudinal axis extending along said path, a force input member having a smooth outer surface and being partially telescopically and slidingly received in one end of said passage, an elongate force output member having a smooth outer surface and being partially telescopically and slidingly received in the other end of said passage and spaced apart from said input member within said passage, the end of one of said members proximate the other of said members having an internally threaded blind bore formed therein, means preventing relative rotation between said housing and said members while permitting relative sliding movement between said housing and said members along said axis, an elongate adjusting screw having external threads formed along a first portion of its length, said first portion being at least partially telescopically and threadably received in said blind bore in an initial position, a worm wheel on a second portion of said adjusting screw, the end of said adjusting screw proximate said worm wheel abutting the end of said other member within said passage, a shaft having a worm gear thereon, mounting means secured to said other member within said passage for unitary linear movement with said other member along said axis and mounting said shaft for movement therewith along said axis while permitting rotation of said shaft about its own axis and in a position wherein said shaft extends transversely of said axis across said passage with said worm gear engaging said worm wheel, and sensing means secured to said shaft and said housing and sensing linear shaft movement of a predetermind magnitude in a first direction along said axis and causing rotation of said shaft upon subsequent reciprocal shaft movement opposite to said first direction only after said shaft movement of a predetermined magnitude, whereby the adjusting screw is rotated in threaded relationship to said one member causing said adjusting screw to become at least partially withdrawn from said initial position in said blind bore of said one member.

2. The slack adjuster of claim 1, wherein said housing has an opening formed therethrough between the ends of said passage, said opening extending in a direction along said axis at least coextensive with the positions of said shaft during shaft movement along said axis, and a closure member, removably secured to the exterior of said housing and closing said opening, whereby upon removal of said closure member from said housing said shaft is accessable from exterior of said housing for manual rotation thereof.

3. The slack adjuster of claim 2, wherein said sensing means comprise a ratchet wheel on said shaft and a pawl secured to the inner wall of said closure member and engaging said ratchet wheel, and resilient means mounted on said closure member and in contact with said pawl and exerting a force on said pawl urging said pawl toward said ratchet wheel.

4. The slack adjuster of claim 1, wherein said mounting means includes a U-shaped bracket having a base portion and a pair of spaced apart arms extending therefrom and positioned about said worm wheel, said shaft being journalled within each of the arms of said bracket with said worm gear being positioned between said arms.

5. The slack adjuster of claim 4, wherein said sensing means comprise a ratchet wheel secured on said shaft and positioned outside the space between said arms, and a pawl secured to said housing and engaging said ratchet wheel.

* * * * *